UNITED STATES PATENT OFFICE.

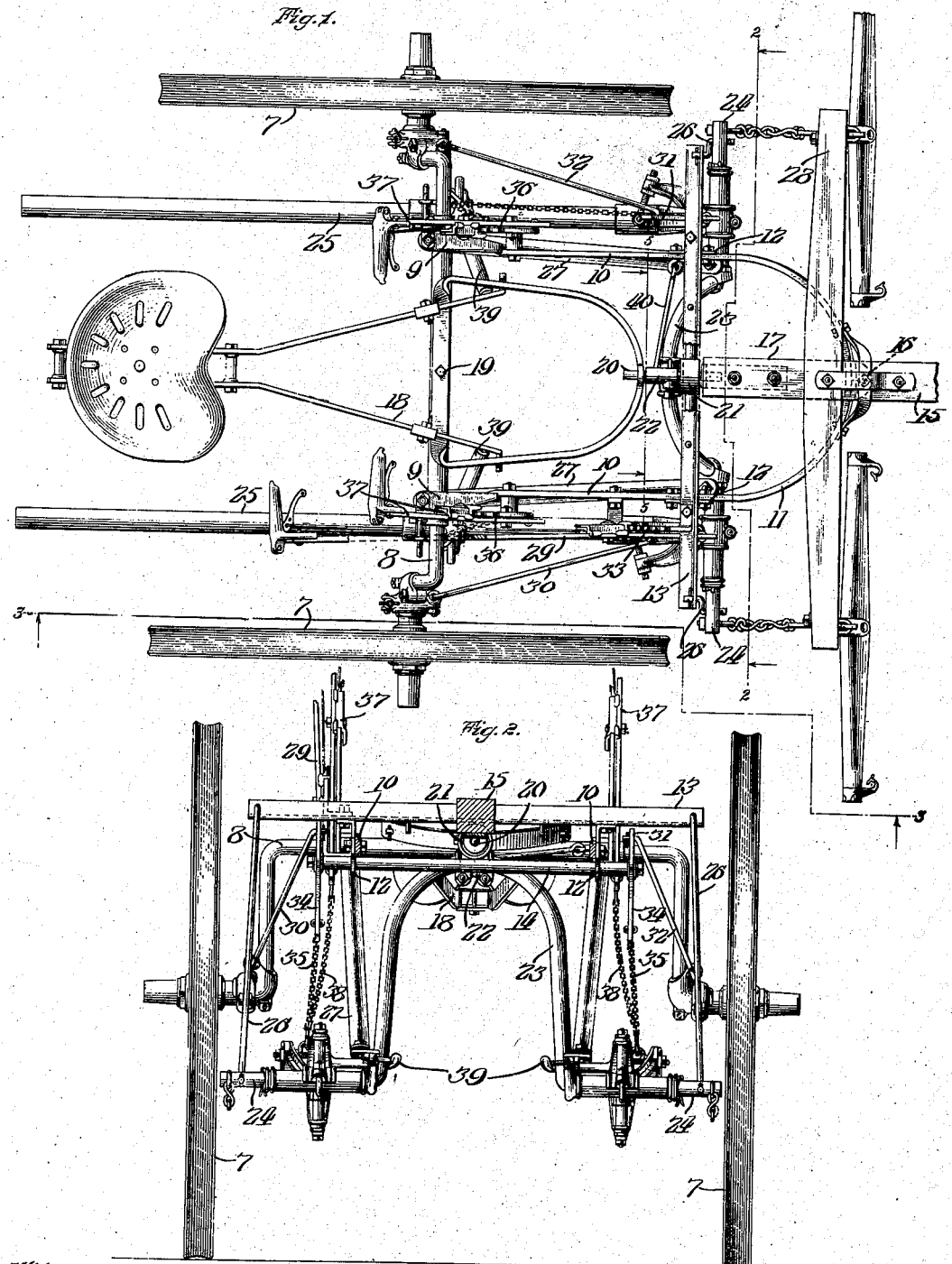

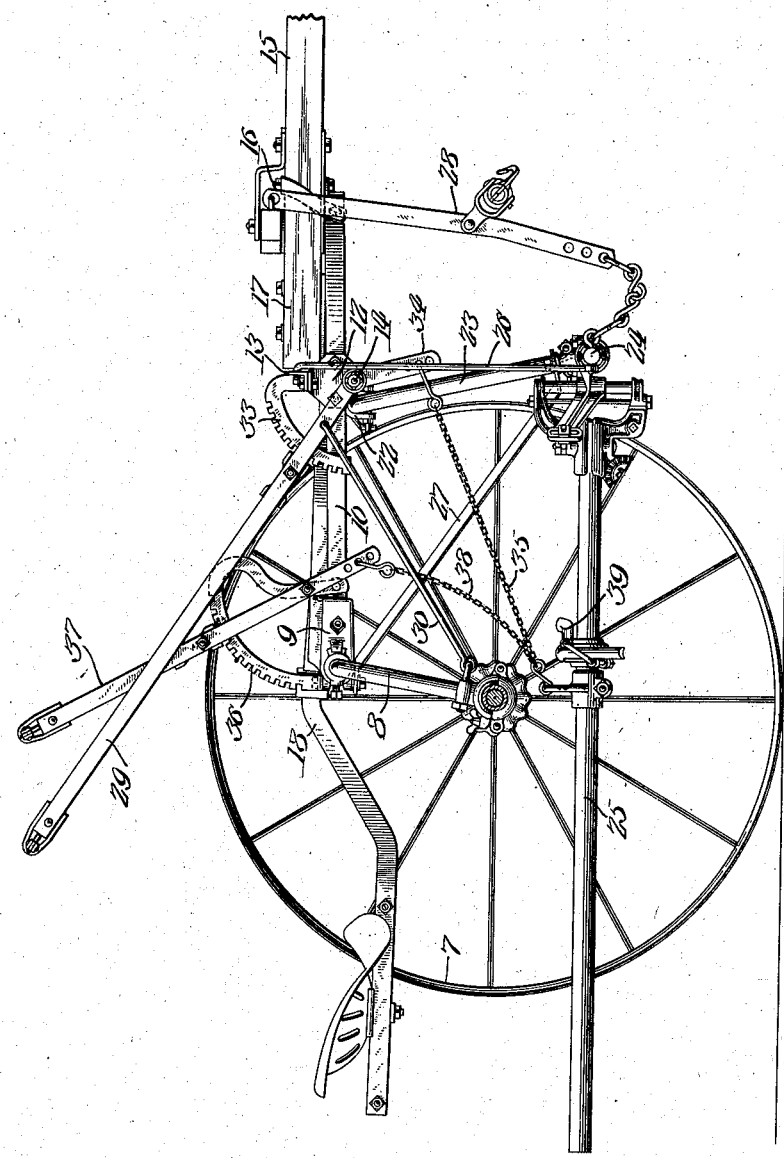

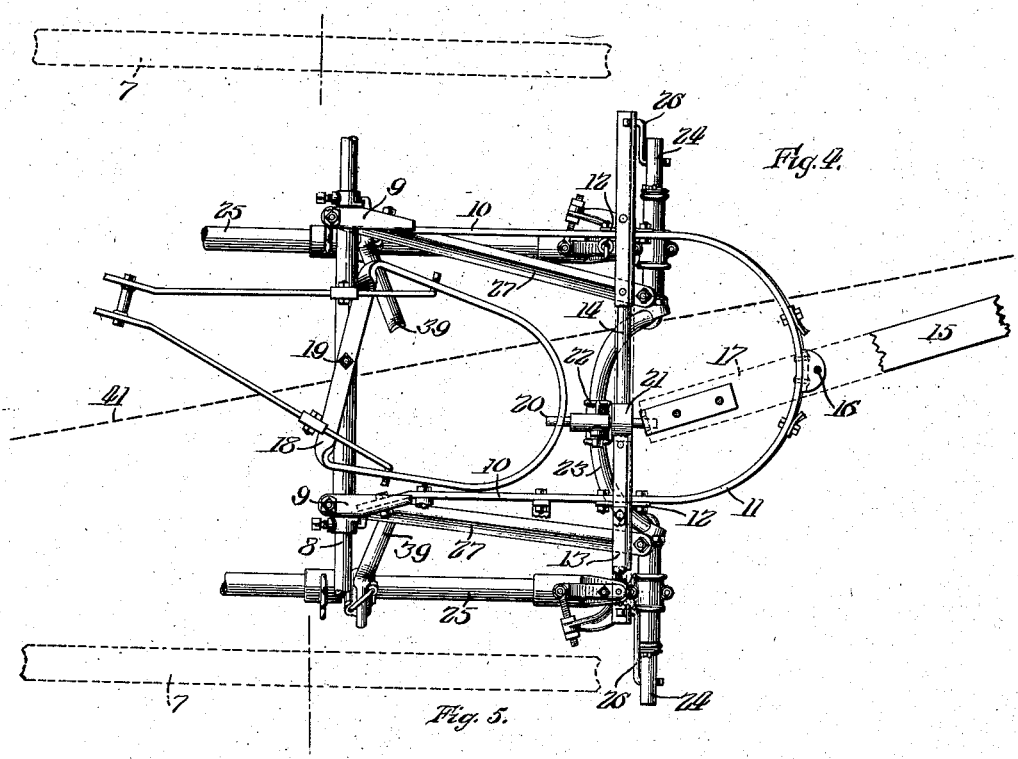

LEWIS E. WATERMAN, OF ROCKFORD, ILLINOIS, ASSIGNOR TO EMERSON-BRANTINGHAM COMPANY, OF ROCKFORD, ILLINOIS, A CORPORATION OF ILLINOIS.

CULTIVATOR.

1,194,580.      Specification of Letters Patent.      Patented Aug. 15, 1916.

Application filed December 6, 1913. Serial No. 805,078.

*To all whom it may concern:*

Be it known that I, LEWIS E. WATERMAN, a citizen of the United States, residing at Rockford, in the county of Winnebago and the State of Illinois, have invented certain new and useful Improvements in Cultivators, of which the following is a specification.

This invention relates to cultivators known as "dodger" cultivators in which the carrying-wheels and shovel-beams are angled to the line of draft for the purpose of evading or dodging obstacles in the path.

The invention relates more particularly to cultivators of the above character which embody in their structure for producing said movement a frame having a draft tongue and a seat-member pivoted thereto for effecting the said angling of the wheels and beams; and it is the object of this invention to provide an improved structure associating the draft tongue and seat-member for effecting the said angling of the wheels and beams.

It is the further object of my invention to provide an improved arrangement of levers for raising and lowering the beams and for moving the carrying-wheels relatively to the frame for balancing same, and to effect these functions simultaneously and independently of adjusting means for limiting the working depth of the beams.

In the accompanying drawings: Figure 1 is a plan view of a cultivator embodying my improvements, a portion of one of the frame cross-bars being broken away. Fig. 2 is a view in elevation looking at the front of the cultivator and as taken on the line 2—2 of Fig. 1. Fig. 3 is a side elevational view of the cultivator, taken on the line 3—3 of Fig. 1. Fig. 4 is a fragmentary plan view of the cultivator showing the relation of movable parts when the beams have been angled to the line of draft, the dotted line through the center of the figure illustrating said line of draft. Fig. 5 is an enlarged view in elevation, as taken on the line 5—5 of Fig. 1, showing the association of the frame, tongue and arched beam-support. Fig. 6 is a vertical sectional view taken on the line 6—6 of Fig. 5, and adds the seat member thereto.

The carrying-wheels 7 support an arched axle 8 the upper portion of which has journaled thereon and spaced apart, two brackets 9 to which are attached frame members 10. These members 10 are the ends of a U-shaped frame 11 whose longitudinality follows that of the cultivator. Brackets 12 are attached fixedly to each frame member 10, located near the forward end of frame 11 and directly opposite each other, and carry fixedly a cross-bar 13 in the form of an angle-bar, above said frame 11, and a cross-bar 14 below said frame in the form of a rod, the ends of both cross-bars extending beyond the sides of frame 11, those of cross-bar 13 extending the farther. From the structure above described a rigid general rectangular frame is provided, comprising, the arch of axle 8, frame members 10 and 11 and cross-bars 13 and 14.

A draft tongue 15 is pivoted intermediate its ends at 16 to the forward end of the frame 11 so that the tongue has a rear end 17 extending between the sides of said frame 11 and reaching within close proximity of the frame cross-bars; and a seat-support member 18 is pivoted intermediate its ends to the arch of axle 8. The forward end of said seat-support and the rear end of the tongue are connected by a shaft 20, at points spaced on the shaft in alinement with the pivots of the seat-support and the tongue, said connections being loose joint connections, more particularly by the ends of said shaft being received in apertures in the end portions of said pivoted members. On the shaft intermediate said members is journaled a roller 21 freely rotatable and adapted to roll between the upper and lower cross-bars 13 and 14 respectively, together with a bracket 22 fixedly mounted and adapted to be attached to a beam-support. The beam-support is disposed crosswise of the main frame and is in the form of an arch 23 having horizontal ends or arms 24, the head of the arch being attached fixedly suspended from the bracket 22 and the said arms 24 having each a shovel-supporting beam 25 mounted thereon in a manner to be vertically pivotal therefrom but fixed against lateral swinging movement with respect to said arms during operation. The outer ends of arms 24 are connected pivotally by links 26 with the ends of the upper cross-bar 13, and links 27 are pivotally connected at their ends to the beam support and the arch of axle 8, said links 26 acting to carry the outer ends of the beam-support and links 27 to brace said beam-support against the suction action of the shovels during operation, both sets of links because of their pivotal mountings acting as parallel movement links to guide the beam-support in a lateral swinging movement relative to the frame. In operation this lateral swinging of the beams and their supporting frame is partly effected by manipulation of the beams through foot-rests 39 attached to each beam. A hook 40 is pivoted to the frame and is adapted to engage an eye on the bracket 22 to lock the beam-support from lateral movement, this hook being detached when the cultivator is in use as a dodger. Draft means 28 are suitably connected to the tongue and beam-support.

A hand-lever 29 is mounted fixed to one end of the cross-rod 14 and has a link 30 connected thereto and to one of the arm portions of the arched axle 8, and an arm 31 is fixed to the opposite end of said cross-rod and is connected to the axle 8 with a link 32 similar to the connection 30; said hand-lever being engageable by the usual manually operated latch with a toothed segment 33 bolted to the cross-bar 13. The hand-lever 29 and arm 31 are each formed with a depending arm 34 and to the free end of these arms are attached chains 35 which connect with the suspended portions of the shovel-beams in such a manner that when the lever 29 is lowered the said shovel-beams will be raised by their chain connections; and simultaneously with this movement of the hand-lever 29 and the moving of the beams thereby, the carrying-wheels will be moved backward relatively to the main frame to effect balancing thereof. A toothed-segment 36 is bolted to each frame bar 10 adjacent the axle 8 and a hand-lever 37 is pivoted intermediate its ends to each toothed-segment, each hand-lever having a thumb-catch engagement with its segment and being connected at its lower end by a chain 38 with a shovel-beam at the same point thereon as the chain 35 is connected. These hand-levers 37 are adapted to be operated independently to limit with their chain connections the working depths of the beams.

Assuming the cultivator to be in position for operation and its operative parts in a position as shown in Fig. 1, the hand-lever 29 may be raised thus lowering the beams and moving the wheels forward by links 30, the beams assuming a position with their shovels (not shown) limited to a working position by the chains 38, the chains 35 having been rendered loose by the above movement of said hand-lever. With the beams thus in their lowered working position they may be adjusted separately as to their working depth by the hand-levers 37, this adjustment not affecting the connection of the lever 37 with the beams and the balancing of the frame. When the end of a row is reached but one hand-lever is operated to raise the beams and shift the wheels, these operations being effected simultaneously by lowering the hand-lever 29. The fact will be observed that the beam adjustment levers have not been interfered with and that they can be adjusted independently while the beams are raised without affecting the beams in their raised position. This is often desirable for having finished a row, the beams having been elevated, the operator may vary the adjustment of the beams without affecting the balance of the cultivator, and then when he commences the new row all that is necessary for him to do is to operate with one hand the lever 29 to lower the beams, the other hand being free to handle the reins, the beams assuming their working position according to said adjustments. When it is desirous of dodging an object in the path of the shovels the wheels and beams are angled to the line of draft and at the same time the beams are shifted laterally with respect to the wheels. These movements are obtained in the following manner: The operator applies forward pressure to the foot-rest 39 on the side to which he wishes to guide the cultivator and simultaneously with this action he produces an opposite force upon the pivoted seat-support, thus the seat-support is swung upon its pivot and the beams and their supporting arch-frame are moved laterally by reason of the pivotal mounting of said arch-frame and of the seat-support and arch-frame both being associated by the connection 20, the same moving by its roller on the cross-bars. The tongue being also associated with said shaft 20 will be swung on its pivot 16. Since the front end of the tongue is held in line with the row by the horses, the rear end of the pole will be swung out of line of said row by its above pivoted movement, thus throwing the main frame of the cultivator out of line with the row causing the cultivator to travel to one side, it being remembered that besides this side movement of the cultivator that there is the independent lateral movement of the beams. In the drawings I have illustrated such a movable position of the cultivator, in Fig. 4, although the movement is somewhat exaggerated as compared to actual practice. It will be noted that the line 41 represents the row being cultivated and the wheels and beams are angled relatively thereto. It will be observed that by the associated connection between the tongue and seat-support being an independent member attached to the beam-support for moving the same, said beam-support may derive a true parallel movement with respect to the frame without undue stress to either the tongue or seat member, and that the parts brought into the combination to obtain this movement are few in number, the pivotal points thereof being so disposed as to get a direct transferring of lateral movement to the beam-support.

I claim as my invention:

1. In a cultivator, the combination with a frame supported by wheels movable relatively thereto for balancing the same and a shovel supporting beam attached to the frame and movable vertically relatively thereto, of a lever pivoted to the frame, a separate connection between the lever and wheels and the lever and beam whereby the said lever may move the wheels and raise the beam simultaneously, and a second lever pivoted to the frame and having a connection with the shovel-beam separate from said first lever connection therewith, for limiting the working depth of said beam.

2. In a cultivator, the combination with a frame supported by wheels movable relatively thereto for balancing the same and a shovel supporting beam attached to the frame and movable vertically relatively thereto, of a pivoted lever, a separate connection between the lever and wheels and the lever and beam whereby said lever may move the wheels and raise the beam simultaneously, and adjustable means separate from said lever connection with the beam for limiting said beam in its working depth.

3. In a cultivator, the combination of a frame, supporting-wheels so connected to the frame as to be movable with respect thereto to effect balancing of the cultivator, vertically movable cultivator beams mounted on the frame, a lever pivoted intermediate its ends to the frame and having a connection at one side of its pivot with the supporting-wheels and at the opposite side of its pivot with the cultivator-beams, whereby the lever when locked will simultaneously effect balancing of the cultivator and movement of the cultivator-beams vertically, and lever means pivoted to the frame and connected to the cultivator-beams by means separate from the first named connections with the cultivator-beams, for limiting the working depth of said cultivator-beams.

4. In a cultivator, the combination of a wheel-supported frame, a tongue and a seat-bar each pivotally mounted intermediate its ends on the frame so as to swing laterally relatively thereto, cultivating devices, an arched support therefor, means connecting the arched support to the frame so that it can shift laterally with respect thereto, including a member connected to the crown of the arched support and slidably movable laterally between spaced horizontal guides, and connections between said member and the front and rear end of the seat-bar and tongue, respectively, whereby the arched support, tongue and seat-bar may be moved laterally in unison and held against vertical displacement by said guides.

5. In a cultivator, the combination of a wheel-supported frame, a tongue and a seat-bar each pivotally mounted intermediate its ends on the frame so as to swing laterally relatively thereto, cultivating devices, an arched support therefor, a bracket secured to the crown of the arched support, a roller mounted on the bracket and disposed between spaced horizontal guides on the frame so as to move laterally thereon and sustain and guide the arch against vertical displacement, and a pivotal connection between the bracket and the front and rear end of the seat-bar and tongue, respectively, whereby they will swing laterally in unison with the arch and be held against vertical displacement.

In testimony whereof I have hereunto set my hand in presence of two subscribing witnesses.

LEWIS E. WATERMAN.

Witnesses:
JOHN F. McCANNA, Jr.,
A. O. BEHEL.